(12) United States Patent
Xue et al.

(10) Patent No.: US 10,649,264 B2
(45) Date of Patent: May 12, 2020

(54) REARVIEW MIRROR WITH DIMMING FUNCTION

(71) Applicant: Smart Liquid Crystal Technologies Co., Ltd., Suzhou (CN)

(72) Inventors: Jiuzhi Xue, Broomfield, CO (US); Chenhui Wang, Cary, NC (US)

(73) Assignee: SMART LIQUID CRYSTAL TECHNOLOGIES CO., LTD., Suzhou (CN)

( * ) Notice: Subject to any disclaimer, the term of this patent is extended or adjusted under 35 U.S.C. 154(b) by 0 days.

(21) Appl. No.: 16/468,733

(22) PCT Filed: Jan. 11, 2018

(86) PCT No.: PCT/CN2018/072286
§ 371 (c)(1),
(2) Date: Jun. 12, 2019

(87) PCT Pub. No.: WO2018/130181
PCT Pub. Date: Jul. 19, 2018

(65) Prior Publication Data
US 2019/0351827 A1 Nov. 21, 2019

(30) Foreign Application Priority Data
Jan. 12, 2017 (CN) .......................... 2017 1 0020929

(51) Int. Cl.
*G02F 1/1333* (2006.01)
*G02F 1/133* (2006.01)
(Continued)

(52) U.S. Cl.
CPC ........ *G02F 1/13338* (2013.01); *G02F 1/1335* (2013.01); *G02F 1/1337* (2013.01);
(Continued)

(58) Field of Classification Search
CPC ............. G02F 1/1335; G02F 1/133536; G02F 1/13362; G02F 1/13725; G02F 1/1338
See application file for complete search history.

(56) References Cited

U.S. PATENT DOCUMENTS

2011/0273659 A1* 11/2011 Sobecki .................. B60R 1/088
349/195
2017/0357111 A1* 12/2017 Fang ........................ G02F 1/137

FOREIGN PATENT DOCUMENTS

CN        101578553 A     11/2009
CN        102331643 A     1/2012
(Continued)

*Primary Examiner* — Dung T Nguyen
(74) *Attorney, Agent, or Firm* — Hoffmann & Baron, LLP

(57) ABSTRACT

A rearview mirror with a dimming function includes: a transparent cover substrate covering substantially the full screen of the rearview mirror, an absorptive polarization layer disposed below the transparent cover substrate with a substantially uniform size, where when non-polarized ambient light passes through the absorptive polarization layer, the layer absorbs light of a polarization parallel to its absorption axis while transmits light of a polarization perpendicular to its absorption axis, a liquid crystal light-controlling layer disposed below the absorptive polarization layer with a substantially uniform size, and a reflective polarization layer disposed below the liquid crystal light-controlling layer with a substantially uniform size, which reflects the light of a polarization parallel to its reflective axis while transmits the light of a polarization perpendicular to its reflective axis. The rearview mirror can automatically adjust reflective light, while improving the utilization of the display light.

14 Claims, 5 Drawing Sheets

(51) Int. Cl.
    *G02F 1/1335*     (2006.01)
    *G02F 1/1337*     (2006.01)
    *G02F 1/13357*     (2006.01)
    *B60R 1/08*     (2006.01)
    *F21V 8/00*     (2006.01)

(52) U.S. Cl.
    CPC ...... *G02F 1/13318* (2013.01); *G02F 1/13362* (2013.01); *G02F 1/133536* (2013.01); *B60R 1/088* (2013.01); *G02B 6/0056* (2013.01)

(56) References Cited

FOREIGN PATENT DOCUMENTS

| | | |
|---|---|---|
| CN | 204055567 U | 12/2014 |
| CN | 105620370 A | 6/2016 |
| CN | 106184001 A | 12/2016 |
| WO | 2008/027031 A2 | 3/2008 |

\* cited by examiner

REARVIEW MIRROR WITH DIMMING FUNCTION

CROSS-REFERENCE TO RELATED APPLICATIONS

This application is the National Stage of International Application No. PCT/CN2018/072286, filed Jan. 11, 2018, which claims the benefit of Chinese Application No. CN 201710020929.4, filed Jan. 12, 2017, the contents of which is incorporated by reference herein.

TECHNICAL FIELD

The present invention relates to an automotive rearview mirror. More particularly, this invention relates to an automotive rearview mirror with a dimming function.

BACKGROUND OF THE INVENTION

In the field of automotive rearview mirrors, automotive rearview mirrors with an auto-dimming function, which automatically adjust the reflected light intensity according to the surrounding ambient light to avoid the danger caused by glare while providing the drivers with better driving conditions, have become increasingly popular these days. Existing auto-dimming technology mainly uses an electrochromic reflective mirrors, a photosensitive device, and an electronic controller to achieve the dimming function. Specifically, when irradiated by the headlight of the vehicle in the rear, the photosensitive device emits a signal, and the electronic controller in turn adjusts the output voltage applied onto the electrochromic reflective mirror, thereby changing the absorption of the incident light by the reflective mirror. The higher the absorption, the less light will be reflected from the mirror, therefore reducing glare. However, if the rearview mirror has an embedded LCD display, the intensity of the display output will also be reduced under auto-dimming condition. The current solution is to significantly increase the backlight intensity of the LCD to offset the dimming effect. However, the disadvantages of such a solution are many: the increased intensity of the backlight will significantly increase the power consumption of the display; this will in turn result in the overheating and the increasing of the temperature of the entire mirror/LCD unit. Under high ambient temperature the LCD risks the complete loss of image under a so-called black screen phenomenon.

Therefore, there is a need in the art for an automotive rearview mirror with an auto-dimming function without affecting the display light intensity to satisfy the above demand.

SUMMARY OF THE INVENTION

In order to overcome the above mentioned issues, the present invention provides a rearview mirror with a dimming function, comprising: a transparent cover substrate substantially covering the full screen of the rearview mirror; an absorptive polarization layer disposed below the transparent cover substrate with a substantially uniform size as the transparent cover substrate, wherein the absorptive polarization layer absorbs light of a polarization parallel to its absorption axis while transmits light of a polarization perpendicular to its absorption axis; a liquid crystal light-controlling layer disposed below the absorptive polarization layer with a substantially uniform size as the absorptive polarization layer; and a reflective polarization layer disposed below the liquid crystal light-controlling layer with a substantially uniform size as the liquid crystal light-controlling layer, wherein the reflective polarization layer reflects light of a polarization parallel to its reflection axis while transmits light of a polarization perpendicular to its reflection axis; and a display layer including at least one display region, wherein the at least one display region is disposed under at least a portion of the reflective polarization layer, and wherein the at least one display region is configured to emit polarized display light of a polarization perpendicular to the reflection axis of the reflective polarization layer. The absorption axis of the absorptive polarization layer is perpendicular to the reflection axis of the reflective polarization layer.

In some preferred embodiments of the present invention, the liquid crystal light-controlling layer may further includes: a liquid crystal molecules layer; a top transparent substrate and a bottom transparent substrate, wherein the inside surfaces of the top transparent substrate and the bottom transparent substrate are respectively coated with a top alignment layer and a bottom alignment layer which can align the liquid crystal molecules near the surfaces, and wherein the liquid crystal molecules layer is sandwiched between the top transparent substrate and the bottom transparent substrate; and a first electrode disposed between the top transparent substrate and the top alignment layer and a second electrode disposed between the bottom transparent substrate and the bottom alignment layer.

In some preferred embodiments, the rearview mirror may further comprises a control device, wherein the first electrode and the second electrode are operatively connected to the control device in order to apply various voltage to the liquid crystal molecules layer through the control device, altering the alignment structure of the liquid crystal molecules and further rotating the polarization of light transmitting through the liquid crystal molecules layer.

In some preferred embodiments, the polarization of a polarized light transmitting through the liquid crystal molecules layer may be varied continuously from 0 to 90 degrees.

In a preferred embodiment, the at least one display region may be configured as a full-screen display area with a substantially uniform size as the reflective polarization layer.

In a preferred embodiment, the rearview mirror may further include an absorption layer disposed below the reflective polarization layer and outside the at least one display region.

In another preferred embodiment, the rearview mirror may further comprise a control device, wherein the first electrode includes a top-first region and a top-second region while the second electrode correspondingly includes a bottom-first region and a bottom-second region, wherein the top-first region and the corresponding bottom-first region constitute a first region while the top-second region and the corresponding bottom-second region constitute a second region. The first region and the second region are capable of being independently applied voltages to alter the rotation degree of the polarization of light transmitting through the liquid crystal molecules layer in the corresponding regions, and the rotation degree can be from 0 to 90 degrees.

In a preferred embodiment, the bottom-first region and the bottom-second region of the second electrode may be an uniform, integral bottom electrode region.

In some preferred embodiments, the first region and the second region are capable of being connected to the control device through different electric circuits, respectively, wherein the size and position of the first region are consistent with that of the at least one display region while the second region corresponds to the non-display region.

In some preferred embodiments, when the at least one display region emits polarized display light, the control device applies different voltages to the first and second regions to adjust the rotation degree of the polarization of light transmitting through the different regions of the liquid crystal molecules layer, thereby altering the polarization of light transmitting through the different regions of the corresponding liquid crystal molecules layer.

In other preferred embodiments, the rearview mirror may further comprise at least one light sensor, wherein the at least one light sensor is operatively connected to the control device. When the light sensor detects strong ambient light, the control device sends a signal to the liquid crystal light-controlling layer to control the reflectivity of the entire rearview mirror. In a further preferred embodiment, the at least one light sensor is disposed below the transparent cover substrate.

In a preferred embodiment, the rearview mirror may further comprise a touch layer that defines at least one touch region with a substantially same size and position as the at least one display region between the transparent cover substrate and the absorptive polarization layer. Outside the touch region, the touch layer also defines a transparent medium region between the transparent cover substrate and the absorptive polarization layer.

In another preferred embodiment, the rearview mirror may further comprise a touch layer defining at least one touch region with a substantially same size and position as the at least one display region between the reflective polarization layer and the at least one display region.

In a preferred embodiment, the rearview mirror may further comprise a polarizing backlight disposed below the at least one display region, wherein the polarizing backlight comprising: a light guide plate; a light source disposed on one side of the light guide plate; a quarter-wave plate and a reflective mirror disposed on the opposite side of the light guide plate against the light source; a birefringent film disposed above the top surface of the light guide plate, wherein the ordinary refractive index of the birefringent film is close to the refractive index of the light guide plate, while the extra-ordinary refractive index of the birefringent film is larger than the refractive index of the light guide plate; and a microstructure disposed between the birefringent film and the top surface of the light guide plate.

In another preferred embodiment, the rearview mirror may further include a polarizing backlight disposed below the at least one display region, wherein the polarizing backlight comprising: a light guide plate; a light source disposed on one side of the light guide plate; and a quarter-wave plate and a reflective mirror disposed on the opposite side of the light guide plate against the light source, wherein the light guide plate includes a liquid crystal molecules layer for polarization scattering, wherein the orientation of the liquid crystal molecules in the liquid crystal molecules layer is defined in a plane perpendicular to the surface of the light guide plate.

In some preferred embodiments, the transparent cover substrate may include transparent glass through chemical or physical strengthening, and rigid or flexible polymer materials, wherein the transparent cover substrate having a light transmittance of 85% or higher.

In a preferred embodiment, the rearview mirror may further comprise an in-cell OGS touch panel formed directly on the transparent cover substrate.

In a preferred embodiment, the display layer may comprise at least one display panel, wherein the display panel includes a TFT type display panel or an LED type display panel.

In a preferred embodiment, the top transparent substrate and/or the bottom transparent substrate can be a transparent glass layer.

In a preferred embodiment, the transparent cover substrate may comprise a reflective coating layer.

The present invention provides a reflection-display-in-one smart rearview mirror with an auto-dimming function, using a reflective polarization layer as a mirror material and further including a liquid crystal light-controlling layer, which thus can automatically adjust the intensity of the reflected light from the rearview mirror according to the surrounding ambient light intensity to achieve anti-glare, while will not affect the display light intensity, improve the utilization of light, reduce energy consumption of the display, and further reduce the rearview mirror temperature.

BRIEF DESCRIPTION OF THE DRAWINGS

These and other features and advantages of the present invention will be better understood by reference to the following detailed description of an illustrative embodiment of the present disclosure when read in conjunction with the accompanying drawings, wherein.

DETAILED DESCRIPTION OF THE INVENTION

The following description of the disclosed embodiments is provided in detail to enable any person skilled in the art to fully understand the present invention. However, it will be apparent to those skilled in the art to readily make or use the present invention without these specific details. In other examples, well-known structures and devices are shown in the block diagram. In this regard, the description of the different illustrative exemplary embodiments presented herein are for the purpose of illustration and description and are not intended to be exhaustive or limited to the inventive concept. Accordingly, the scope of the invention is not to be limited by the specific embodiments described above, and is subject only to the scope of the appended claims.

Figure 1:
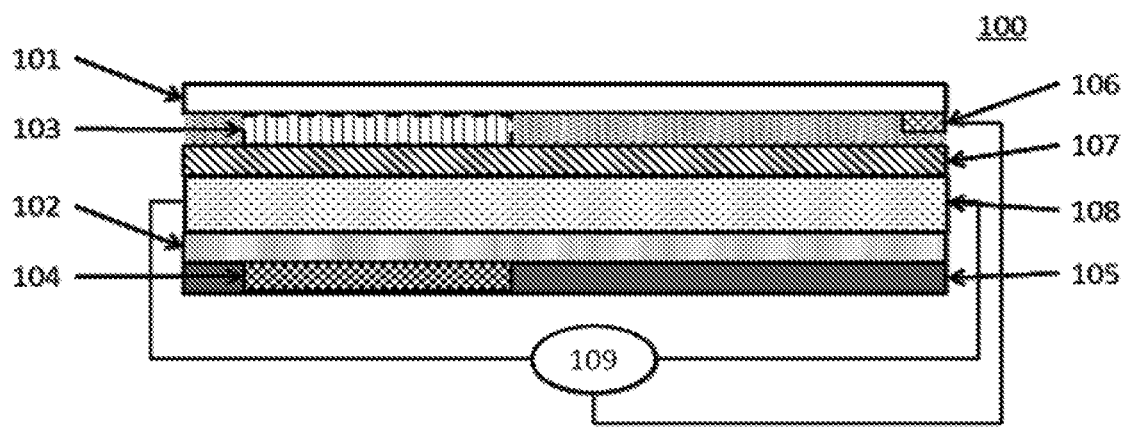
FIG. 1 is a schematic, illustrative view of a mirror body portion of a rearview mirror according to an exemplary embodiment of the present invention.

Referring first to FIG. 1, a rearview mirror with a dimming function according to an embodiment of the present invention is described. The rearview mirror includes a mirror body portion 100, a housing, and a bracket (not shown). The mirror main body portion 100 includes a transparent cover substrate 101, a reflective polarization layer 102, and an absorptive polarization layer 107 and a liquid crystal light-controlling layer 108 disposed between the transparent cover substrate 101 and the reflective polarization layer 102. Further, the mirror body portion 100 may include a touch layer 103, a display layer 104, an absorption layer 105, a light sensor 106 mounted inside the transparent cover 101, and a control device 109, as described in detail below.

According to an embodiment, the transparent cover substrate 101 thereof can substantially cover the full screen of the rearview mirror. The transparent cover substrate 101 includes transparent glass through chemically or physically strengthening, and a rigid or flexible polymeric material, which does not limit the present invention and other materials with a light transmittance conforming to the requirements may also be used. Preferably, the transparent cover substrate 101 has a light transmittance of 85%, 90%, 95% or higher. Preferably, the thickness of the transparent cover substrate is between 0.5 mm and 3 mm.

The absorptive polarizing layer 107 is disposed below the transparent cover substrate 101 with a substantially uniform size as the transparent cover substrate 101. Whereas, when non-polarized ambient light passes through the absorptive polarization layer 107, the absorptive polarization layer 107 absorbs light of a polarization parallel to the absorption axis of the absorptive polarization layer 107 and transmits light of a polarization perpendicular to its absorption axis, so as to ensure the following dimming process. The absorptive polarization layer 107 can be a polarizer widely used in liquid crystal displays, and the manufacturers include Shenzhen SAPO Photoelectric Co., Ltd. from China, Shenzhen Sunnypol Optoelectronics Co., Ltd. from China, and Nittoh Sangyo Co., Ltd from Japan, etc.

Figure 4:
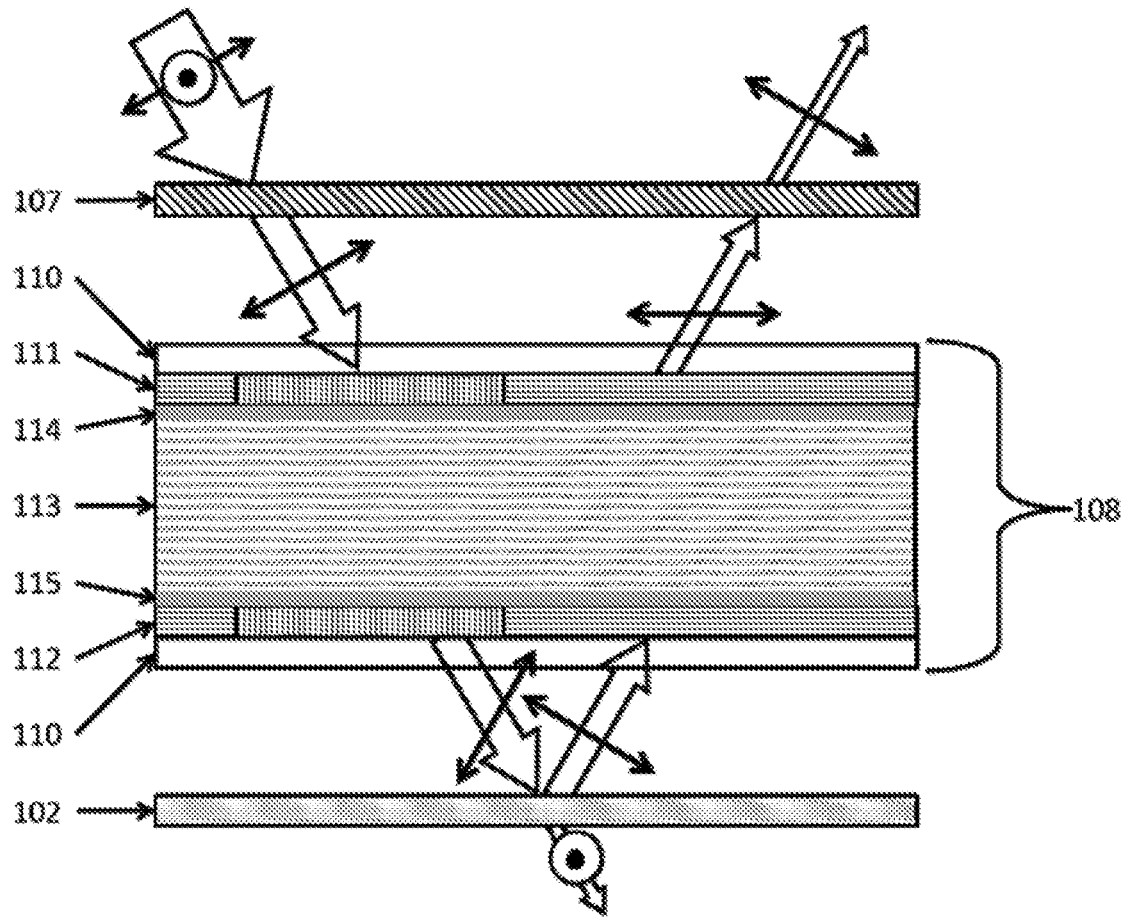
FIG. 4 is a schematic, illustrative view of the working principle of a rearview mirror in a specular reflection state according to an exemplary embodiment of the present invention.

The liquid crystal light-controlling layer 108 may be disposed below the absorptive polarization layer 107 with a substantially uniform size as the absorptive polarization layer 107. As shown in FIG. 4, the liquid crystal light-controlling layer 108 includes: a top and a bottom corresponding transparent substrates 110; a first electrode 111, a second electrode 112, a top alignment layer 114 and a bottom alignment layer 115 disposed between the transparent substrates 110; and a liquid crystal molecules layer 113 sandwiched between the top alignment layer 114 and the bottom alignment layer 115.

According to some embodiments, the transparent substrate 110 can be a transparent glass layer. The top alignment layer 114 and the bottom alignment layer 115 have ability of aligning the liquid crystal molecules in the vicinity of the surfaces, and are coated on the inner sides of the top and bottom transparent substrates, respectively. That is, the liquid crystal molecules layer 113 are substantially sandwiched between the top transparent substrate coated with the top alignment layer 114 and the bottom transparent substrate coated with the bottom alignment layer 115. The first electrode 111 is disposed between the top transparent substrate and the top alignment layer, and the second electrode 112 is disposed between the bottom transparent substrate and the bottom alignment layer. Preferably, the first electrode 111 and the second electrode 112 may use a transparent conductive material ITO, achieving both power supply and light propagation without affecting each other. However, the present invention is not limited thereto and other materials without effect on light transmission may be applied as well.

Figure 2:
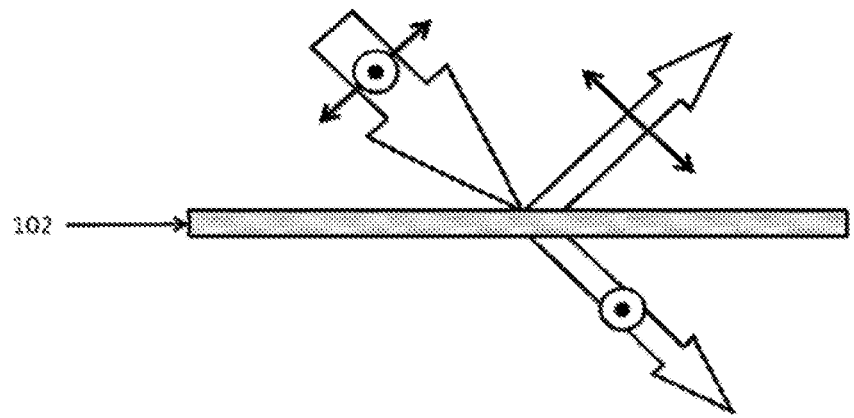
FIG. 2 is a schematic, illustrative diagram of the reflection principle of a reflective polarization layer to an ambient light according to an exemplary embodiment of the present invention.

The reflective polarization layer 102 may be disposed below the liquid crystal light-controlling layer 108 with a substantially uniform size as the liquid crystal light-controlling layer 108. The reflective polarization layer 102 may be a transflective optical layer. Referring to FIG. 2, the reflection principle of the reflective polarization layer 102 to ambient light is illustrated. As shown, the reflective polarization layer 102 reflects light of a polarization parallel to the reflection axis of the reflective polarization layer 102 and transmits light of a polarization perpendicular to the reflection axis of the reflective polarization layer 102. The reflective polarization layer commonly can be a DBEF film comprising multi-layer birefringent polymer materials and produced by the 3M Company of the United States, or a wiregrid reflective polarizer produced by Moxtek Inc. of the United States.

It is to be noted that the absorption axis of the absorptive polarization layer 107 is perpendicular to the reflection axis of the reflective polarization layer 102 according to the embodiments of the present invention. As a result, when ambient light is incident on the mirror main body portion 100, the light transmitting through the absorptive polarization layer 107 (having a polarization perpendicular to its absorption axis thereof) is reflected by the reflective polarization layer 102, then passes through the absorptive polarization layer 107 again, therefore achieving specular reflection.

In FIG. 1, according to a further embodiment, the first electrode 111 and the second electrode 112 may be operatively connected to the control device 109 to apply various voltages to the liquid crystal molecules layer 113 through the control device 109, thereby altering the alignment structures of liquid crystal molecules to adjust the polarization of the light passing through the liquid crystal molecules layer 113. When a voltage within a certain range is applied between the first electrode 111 and the second electrode 112, the orientation of the liquid crystal molecules in the liquid crystal molecules layer 113 may be tilted and the tilted degree depends on the magnitude of the applied voltage. Under the co-action of the top alignment layer 114 and the bottom alignment layer 115, the alignment structure of the liquid crystal molecules may be changed so as to adjust the polarization of the light passing through the liquid crystal molecules layer 113 and finally achieve the effect of dimming. Preferably, the polarization of the polarized light passing through the liquid crystal molecules layer 113 can be continuously changed from 0 to 90 degrees, so that the output light intensity can be accurately adjusted. All liquid crystal displays with electronically controlled birefringence properties known to those skilled in the art can be used to achieve dimming functions. For example, the liquid crystal molecules layer may be a twisted nematic liquid crystal layer which is well known to those skilled in the art, and the orientation of its liquid crystal molecules is rotated by 90 degrees from the first electrode to the second electrode under the action of the top alignment layer 114 and the bottom alignment layer 115, wherein the transmission axes of the reflective polarization 102 and the absorptive polarization layer 107 are parallel to the alignment directions of the liquid crystal molecules immediately adjacent to them respectively. When the voltage is not applied, under the cooperation of the thickness of the liquid crystal molecules layer and the refractive index, the polarization of the light is substantially rotated along the alignment of the liquid crystal molecules, which from the first electrode to the second electrode, is rotated substantially 90 degrees. For common twisted nematic liquid crystal devices, when the applied voltage reaches 5V, the majority of the liquid crystal molecules in the liquid crystal layer are substantially undergo a vertical arrangement, therefore loses the rotation function for the polarization.

Specifically, when non-polarized ambient light passes through the absorptive polarization layer 107, light of a polarization parallel to the absorption axis of the absorptive polarization layer 107 is absorbed, and only light of a polarization perpendicular to the absorption axis is transmitted. The transmitted linearly polarized light enters the liquid crystal light-controlling layer 108. At the same time, the control device 109 outputs a corresponding voltage to the first electrode 111 and the second electrode 112 based on the feedback information, and the liquid crystal molecules in the liquid crystal molecules layer 113 adjust the tilting angle according to the magnitude of the voltage to change the polarization of the polarized light passing through the liquid crystal molecules layer 113. The acquisition of feedback information includes, but not limited to, the light sensor 106 sensors the light intensity of ambient light and send the information back to the control device 109. The setting of the light sensor 106 will be described in detail below. Depending on the magnitude of the applied voltage, the rotation degree of the polarization may vary from 0 to 90 degrees (excluding 90). Since the reflection axis of the reflective polarization layer 102 is set to coincide with the transmission axis of the absorptive polarization layer 107, the linearly polarized light finally passed through the liquid crystal light-controlling layer 108 is only partially reflected back by the reflective polarization layer 102. After passing through the liquid crystal light-controlling layer 108 whereas the polarization is adjusted one more time, it is again partially transmitted through the absorptive polarization layer 107 and back to the viewers, so as to achieve the automatic dimming specular reflection.

Figure 3:
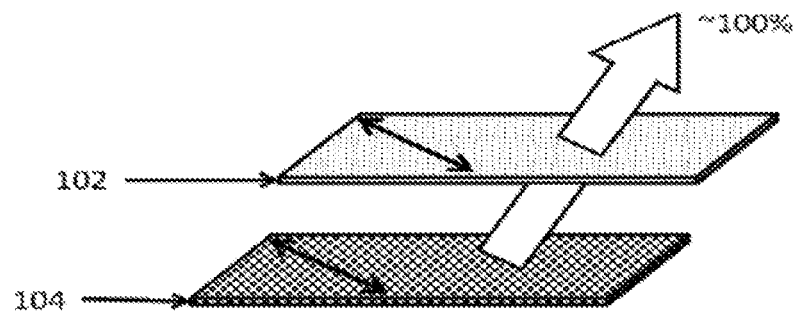
FIG. 3 is a schematic, illustrative diagram of the transmission principle of a reflective polarization layer to a display light according to an exemplary embodiment of the present invention.

The rearview mirror according to some embodiments may further include a display layer 104, which defines at least one display region. The display region is disposed below at least a portion of the reflective polarization layer 102 and provides a display function. In some embodiments, the display region may be configured as a full-screen display area with a substantially uniform size as the reflective polarizer layer 102. As shown in FIG. 3, based on the optical characteristics of the reflective polarization layer 102, the display light emitted from the display layer 104 satisfies two conditions: one is that it is a polarized light; the second is that the polarization thereof is parallel to the transmission axis of the reflective polarization layer 102. In such a case, approximately 100% of the display light can pass through the reflective polarization layer 102, thereby reducing light loss and improving the brightness and contrast of the display screen. According to some embodiments, the display layer 104 may include at least one display panel, which may be a TFT type display panel, a LED type display panel, or other display panel selected in accordance with the actual situation. The size, number, and location of the display panels can be adjusted according to actual needs.

Figure 5:
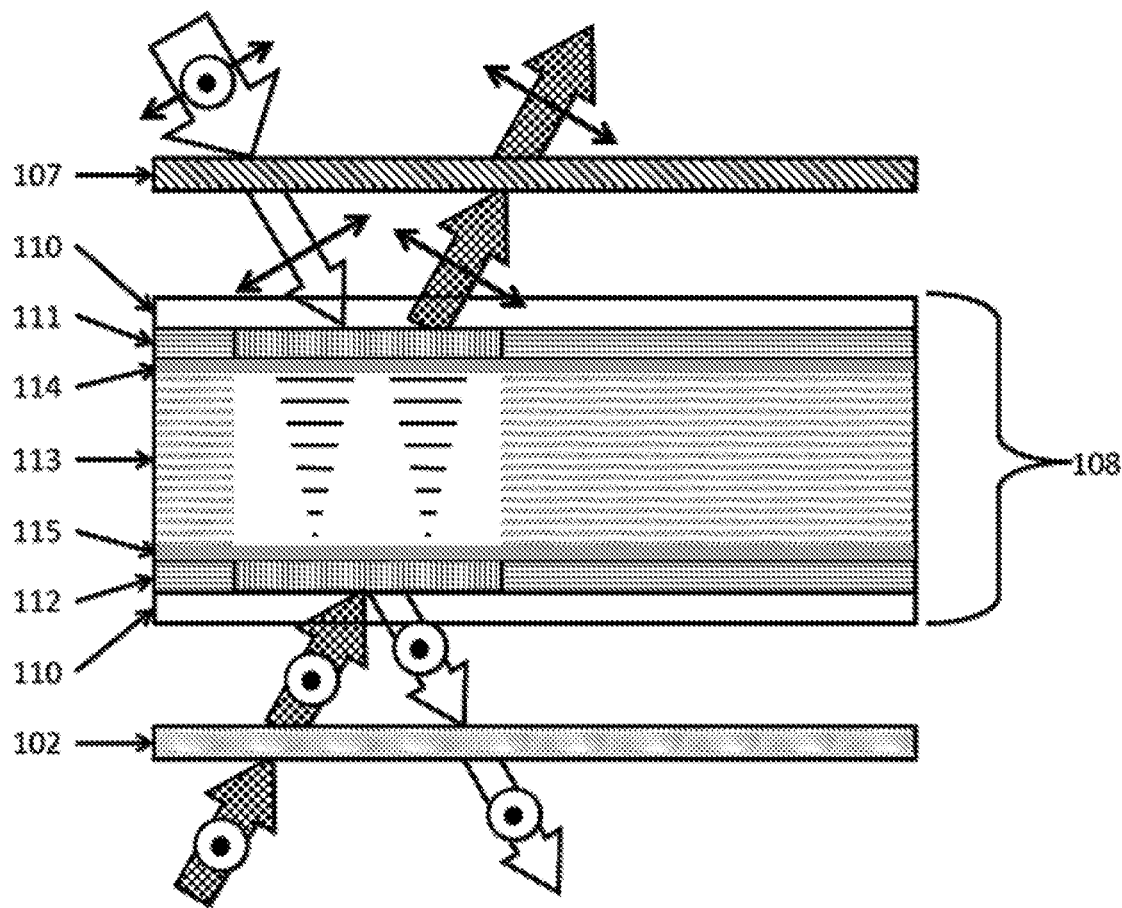
FIG. 5 is a schematic, illustrative view of the working principle of a rearview mirror in a smart display state according to an exemplary embodiment of the present invention.

In FIG. 5, according to a further embodiment, the first electrode 111 may be provided to include a top-first region and a top-second region, while the second electrode 112 may include a bottom-first region and a bottom-second region. In an alternative embodiment, the second electrode 112 has only one region, which means the bottom-first and bottom-second regions included in the second electrode 112 are a uniform, integrated bottom electrode region. The top-first region and the corresponding bottom-first region constitute a first region, while the top-second region and the corresponding bottom-second region constitute a second region. Whereas, the first region and the second region are connected to the control device 109 through different electronic circuits to be independently applied voltages, therefore changing the rotation degree of the polarization of light passing through the liquid crystal molecules layer 113 of the corresponding regions. The rotation degree varies from 0 degree to 90 degrees.

Further, the size and position of the first region may coincide with the at least one display region, while the second region corresponds to the rest non-display area. When the rearview mirror is in specular reflection state under dimming, a consistent voltage can be applied both to the first and second regions as shown in FIG. 4, and then the liquid crystal molecules of the liquid crystal molecules layer 113 in the two regions will respond to the applied voltage to show a same tilting state. And when the rearview mirror is in the smart display state, the first and second regions may be applied with different types of voltages, as shown in FIG. 5. Specifically, in the second region, a voltage is applied between the first electrode 111 and the second electrode 112 through same principle as the specular reflection state, and its magnitude thereof varies depending on the intensity of the ambient light. On the other hand, in the first region, a completely different and specific voltage that is not determined by the ambient light intensity, is applied between the first electrode 111 and the second electrode 112, and the alignment of the liquid crystal molecules can be adjusted so that the polarization of the polarized light passing through the liquid crystal molecules layer 113 is directly changed by 90 degrees. As a result, the polarization of the ambient light passing through the liquid crystal light-controlling layer 108 is parallel to the transmission axis of the reflective polarization layer 102, so that the changed ambient light cannot be reflected but transmitted into the interior of the mirror to be absorbed by the absorption layer 105 finally. The setting of the absorbent layer 105 will be described in detail below. In contrast, the polarization of the display light emitted from the display layer 104 is rotated by the liquid crystal light-controlling layer 108 and is parallel to the transmission axis of the absorptive polarization layer 107, which results in that most of the display light is transmitted through the rearview mirror and reaches the eyes of the observer. In this way, the purpose of automatic dimming and reflection display integration can be fulfilled, while the energy consumption of the rearview mirror display part is saved and the internal temperature of the rearview mirror is reduced.

The rearview mirror according to some embodiments may further include an absorption layer 105, which may be disposed under the reflective polarization layer 102 and in the non-display region, to absorb the ambient light passing through the reflective polarization Layer 102 and other excess light. As a result, the light entering the interior of the mirror main body through the reflective polarization layer 102 is finally absorbed by the absorption layer 105. Preferably, the absorption layer can be a type of black glue, a black tape or a black resin.

The rearview mirror according to some embodiments may further include at least one light sensor 106, which is disposed behind the transparent cover plate 101 and is operatively connected to the control device 109. When the light sensor 106 detects strong ambient light, an information can be fed back to the control device 109, and the control device 109 can output the corresponding voltage between the first electrode 111 and the second electrode 112 according to the obtained information, thereby controlling the liquid crystal light-controlling layer 113, and further controlling the reflectivity of the entire rearview mirror. According to an embodiment of the present invention, the light sensor 106 may be, for example, a photodiode or a photoresistor, which is relatively small in size to avoid affecting the propagation of the reflected or display light. In addition, the light sensor 106 may be multiple and evenly distributed anywhere in the rearview mirror, including the mirror portion, the outer surface of the rear housing, and the rearview mirror holder.

The rearview mirror according to an embodiment of the present invention may further include a touch layer 103 which defines a touch region with a substantially same size and position as the at least one display region between the transparent cover substrate 101 and the absorptive polarization layer 107. Outside the touch region, a transparent medium region is defined between the transparent cover substrate 101 and the absorptive polarization layer 107. The transparent media can be optical glue, glass or polymers, but not limited to these. In an alternative embodiment, the touch layer 103 may define a touch region with a substantially same size and position as the at least one display region between the reflective polarization layer 102 and the at least one display region. Preferably, the touch layer has a capacitive touch layer technique based on a glass substrate with a thickness between 50 microns and 500 microns. Preferably, the transparent medium is made of silica gel, which is relatively resistant to ultraviolet rays and has a refractive index similar to that of the transparent cover substrate 101, the outer layer of the display and the touch layer. The thickness of the transparent medium layer is between 1 micron and 100 microns.

The touch layer 103 includes any type of touch panels whose position, number and size are correspond to that of the display panels disposed underneath them; alternatively, the touch layer 103 may not be used depending on the needs of some display panels. Further, the touch layer 103 may also use an OGS touch screen where a touch sensor is directly formed on the transparent cover substrate 101 by an integrated touch technology, thereby saving cost, further reducing the weight, and increasing the light transmittance of the mirror body portion. Preferably, the touch screen sensing system is integrated with the display to form a touch-display-integrated system (on-cell or in-cell touch display system).

In addition, since the polarizers of the liquid crystal devices will absorb light, the reflectivity is not very high (In general definitions, the reflectivity of a reflective glass must be 40-45%, but the reflectivity of the surface of a liquid crystal device can only reach 40%). Therefore, the transparent cover substrate 101 may further include a reflective coating layer to increase the reflectivity. By applying the reflective coating layer on either side of the transparent cover substrate 101, the reflectivity can be increased by 0 to 20%.

In one embodiment, OCA optical glue or PSA pressure-sensitive adhesive is applied between the transparent cover substrate 101, the reflective polarization layer 102, the touch layer 103, the display layer 104, the absorption layer 105, the absorptive polarization layer 107, and the liquid crystal light-controlling layer 108 to tightly form a uniform one-piece structure, minimizing the internal space of the rearview mirror. Although, for convenience of description, the rearview mirror is described in terms of a multi-layer structure, it will be understood by those skilled in the art that any two or more layers, or even all of the above layers, may be integrated through coating, depositing, permeating, doping, injecting, lithography/patterning, fusion, pressing, molding, and so on to produce a multi-functional monolayer structure.

The rearview mirror according to the present invention may further include a polarizing backlight disposed below the at least one display region, wherein the polarization of the polarized light emitted from the polarizing backlight is substantially parallel to the transmission axis of the display panel polarizer closer to the backlight side. Well known by those skilled in the art, the basic structure of a liquid crystal display (e.g., LED, TFT) comprises a backlight, a bottom polarizer, a liquid crystal layer, a color filter, and a top polarizer. In the present invention, the polarization of the top polarizer (far away from the backlight) is parallel to the polarization of light emitted from the display, as well as to transmittance axis of the reflective polarization layer. Differently, the polarization of the bottom polarizer (closer to the backlight) is parallel to the polarization of the polarized backlight.

Figure 6:
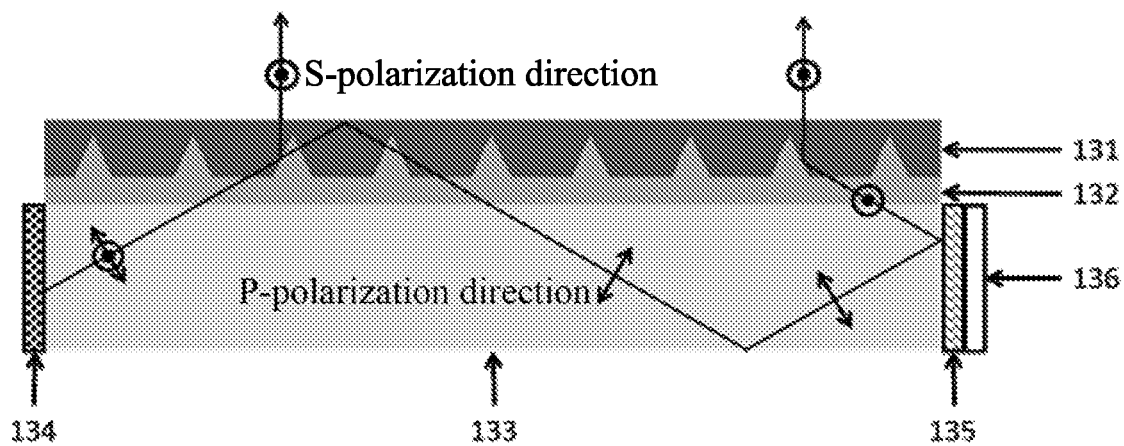
FIG. 6 is a schematic, illustrative view of a polarizing backlight of a rearview mirror according to an exemplary embodiment of the present invention.
Figure 7:
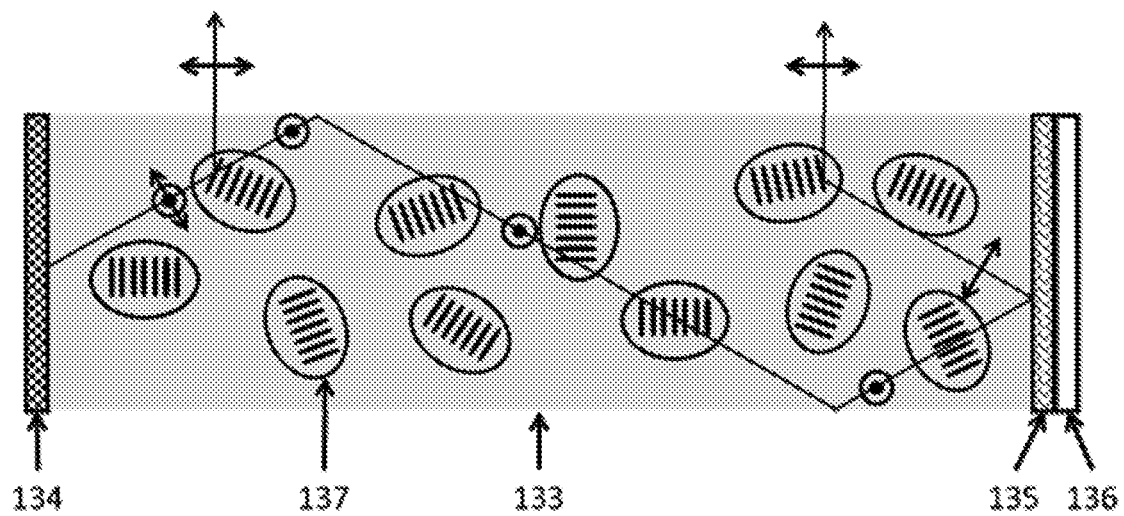
FIG. 7 is a schematic, illustrative view of a polarizing backlight of a rearview mirror according to another exemplary embodiment of the present invention.

In FIG. 6 and FIG. 7, the schematic views of two types of polarizing backlights used by the rearview mirrors according to some embodiments are shown respectively. In FIG. 6, the polarizing backlight includes a light guide plate 133, a light source 134 disposed on one side of the light guide plate 133, a quarter-wave plate 135 and a reflective mirror 136 disposed on the opposite side of the light guide plate 133 against the light source 134, a birefringent film 131 disposed on the upper surface of the light guide plate 133, and a microstructure 132 disposed between the birefringent film 131 and the above mentioned upper surface. The refractive index of the ordinary light (p-polarization) of the birefringent film 131 is close to that of the light guide plate 133, while the refractive index of the extraordinary light (s-polarization) is larger than that of the light guide plate 133. As a result, when natural light is emitted from the light source 134, the part of s-polarization will change the propagation direction after incident on the prism (triangular) interface of the light guide plate 133 and the birefringent film 131, and is emitted from the birefringent film 131 in an angle less than the critical exit angle of the light guide plate 133, while the light of p-polarization is incident on the interface of the birefringent film 131 and the air without any effect, and is total-reflected back to the light guide plate 133, in turn is reflected and changed its polarization by the quarter-wave plate 135 and the reflective mirror 136, and is then emitted out again after being re-cycled.

In FIG. 7, the polarizing backlight includes a light guide plate 133, a light source 134 disposed on one side of the light guide plate 133, a quarter-wave plate 135 and a reflective mirror 136 disposed on the opposite side of the light guide plate 133 against the light source 134. The light guide plate 133 includes a liquid crystal molecules layer 137 for polarization scattering, and the orientation of the liquid crystal molecules in the liquid crystal molecules layer 137 is substantially confined in a plane perpendicular to the surface of the light guide plate 133 so that the liquid crystal molecules layer 137 can scatter light of a polarization in the plane. As a result, when natural light is emitted from the light source 134, the part in p-polarization is scattered by the liquid crystal molecules layer 137 and emitted from the surface of the light guide plate 133 with an angle smaller than the critical exit angle of the light guide plate 133, while the light in the s-polarization is propagated in the light guide plate 133 due to total-reflection, finally is reflected by the quarter-wave plate 135 and the reflective mirror 136 and changes its polarization, and is scattered by the liquid crystal molecules layer 137 to emit out of the light guide plate 133 after recycled.

The polarizing backlight according to the embodiments of the present invention has a polarization substantially parallel to the transmission axis of the polarizer closer to the backlight of the display, so as to ensure that the light of the backlight can be transmitted approximately 100% into the interior of the display and improve the utilization ratio of the backlight. At the same time, compared to the traditional displays using non-polarized light source, with the same intensity of the backlight, the display brightness of the display using polarizing backlight can be increased by more than 50%, improving the display performance even in a bright environment. Similarly, the brightness of the polarizing backlight according to an embodiment of the present invention can be reduced by 30% or more under the same emission luminance conditions, so that the power consumption can be reduced and the temperature inside the rearview mirror can be reduced.

Figure 8:
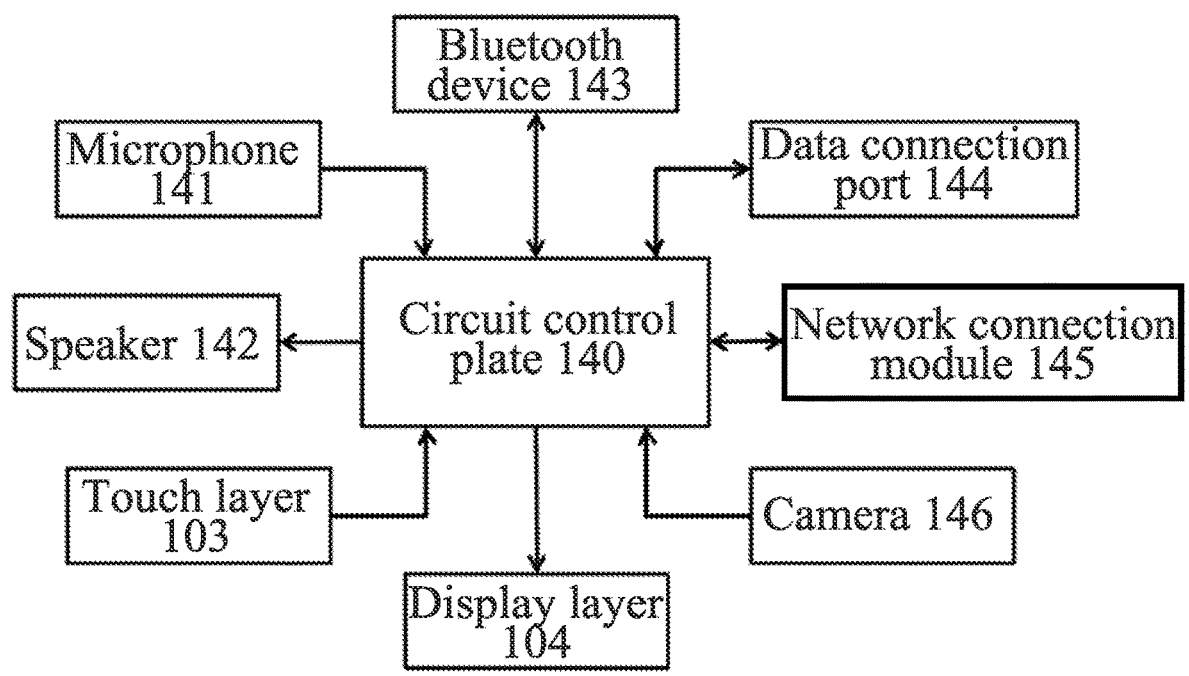
FIG. 8 is an additional functional block diagram of a rearview mirror according to one exemplary embodiment of the present invention.

In a further embodiment, the mirror body portion 100 of the rearview mirror may be mounted on the front side of the housing. The rearview mirror may further include a circuit control plate 140 embedded in the housing, as shown in FIG. 8, for controlling all functions of the rearview mirror. Preferably, according to the embodiment shown in FIG. 8, a microphone 141, a speaker 142, a Bluetooth device 143, a data connection port 144, a network connection module 145, and a camera 146 may be further disposed in the rear portion of the housing to realize the smart functions of vehicle navigation, entertainment, driving records, Bluetooth calls, data transmission, car WiFi or cellular 4G network connectivity and so on. The bracket can be directly connected to the rearview mirror as a vehicle-based original manufacturing equipment; it can also be designed as a special structure, which turns the rearview mirror into an aftermarket parts and then can be directly installed onto the existing rearview mirror system.

In summary, the present invention provides a reflection-display-in-one smart rearview mirror with an auto-dimming function, where a reflective polarization layer is used as a mirror material and a liquid crystal light-controlling layer is added. It automatically adjusts the rearview mirror reflective light intensity according to the ambient light condition to achieve the anti-glare without affecting the display light intensity, improves the display light utilization, reduces the display energy consumption, and further reduces the rearview mirror temperature.

In addition, for the purpose of concise illustration, the drawings herein are described in terms of a substantially planar form. However, it should be understood by those skilled in the art that the rearview mirror (and all of its functional layers) of the present invention may also include concave and convex curved surfaces, such as cylinders, spheres, ellipsoids, parabolas, or their combination. In addition, it will be appreciated by those skilled in the art that the rearview mirror of the present invention may also be applied to a combined rearview mirror system which has two or more different mirrors with different reflection directions or curvature characteristics.

Also, for the purpose of concise illustration, the present invention has not discussed in detail other methods carried out by those skilled in the art, where the orientation of liquid crystal molecules or the polarization of light passing through the liquid crystal molecules layer can be adjusted in the manner of applying different range and modes of voltage, magnetic field, radiation, mechanical action (including vibration, etc.), chemical and biochemical effects, etc. It should be understood by those skilled in the art that these dimming schemes and their foreseeable improvements and combinations of these dimming schemes may be applied to the present invention, and are intended to be included within the scope of the present disclosure as defined by the appended claims inside. Specifically, with regard to the use of voltage dimming, see "Fundamentals of Liquid Crystal Devices" (Shin-Tson Wu, Deng-Ke Yang, edited by Wiley; 2006 Sep. 26 First Edition), whose contents are incorporated by reference into this description.

While several particular exemplary embodiments have been described above in detail, the disclosed embodiments are considered illustrative rather than limiting. Those skilled in the art will readily realize that alternatives, modifications, variations, improvements, and substantial equivalents are possible without substantially departing from the novelty spirits or scope of the present disclosure. Thus, all such alternatives, modifications, variations, improvements, and substantial equivalents are intended to be embraced within the scope of the present disclosure as defined by the appended claims.

The invention claimed is:

1. A rearview mirror with a dimming function, comprising:
   a transparent cover substrate substantially covering the full screen of the rearview mirror;
   an absorptive polarization layer positioned below the transparent cover substrate with a substantially uniform size as the transparent cover substrate, wherein the absorptive polarization layer absorbs light of a polarization parallel to the absorption axis of the absorptive polarization while transmits light of a polarization perpendicular to the absorption axis of the absorptive polarization;
   a liquid crystal light-controlling layer positioned below the absorptive polarization layer with a substantially uniform size as the absorptive polarization layer;
   a reflective polarization layer positioned below the liquid crystal light-controlling layer with a substantially uniform size as the liquid crystal light-controlling layer, wherein the reflective polarization layer reflects light of a polarization parallel to the reflection axis of the reflective polarization layer while transmits light of a polarization perpendicular to the reflection axis of the reflective polarization layer;
   a display layer including at least one display region, wherein the at least one display region is disposed under at least a portion of the reflective polarization layer, and wherein the at least one display region is configured to emit polarized display light of a polarization perpendicular to the reflection axis of the reflective polarization layer,
   wherein the absorption axis of the absorptive polarization layer is perpendicular to the reflection axis of the reflective polarization layer; and
   a touch layer,
   wherein the touch layer defines at least one touch region with a substantially same size and position as the at least one display region between the transparent cover substrate and the absorptive polarization layer or between the reflective polarization layer and the at least one display region.

2. The rearview mirror as defined in claim 1, wherein the liquid crystal light-controlling layer further comprises:
   a liquid crystal molecules layer;
   a top transparent substrate and a bottom transparent substrate, wherein the inside surfaces of the top and bottom transparent substrates are respectively coated with a top alignment layer and a bottom alignment layer which can align the liquid crystal molecules near the surfaces, and wherein the liquid crystal molecules layer is sandwiched between the top transparent substrate and the bottom transparent substrate; and
   a first electrode disposed between the top transparent substrate and the top alignment layer and a second electrode disposed between the bottom transparent substrate and the bottom alignment layer.

3. The rearview mirror as defined in claim 2, further comprising a control device, wherein the first electrode and the second electrode are operatively connected to the control device in order to apply various voltage to the liquid crystal molecules layer through the control device, altering the alignment structure of the liquid crystal molecules, and further rotating the polarization of the light transmitting through the liquid crystal molecules layer.

4. The rearview mirror as defined in claim 3, wherein the polarization of the polarized light transmitting through the liquid crystal molecules layer can be rotated continuously from 0 to 90 degrees.

5. The rearview mirror as defined in claim 2, further comprising a control device, wherein the first electrode includes a top-first region and a top-second region while the second electrode correspondingly includes a bottom-first region and a bottom-second region, wherein the top-first region and the corresponding bottom-first region constitute a first region while the top-second region and the corresponding bottom-second region constitute a second region, and wherein the first region and the second region can be independently applied voltages to alter the rotation degree of the polarization of light transmitting through the liquid crystal molecules layer in the corresponding region, and wherein the rotation degree is from 0 to 90 degrees.

6. The rearview mirror as defined in claim 5, wherein the bottom-first region and the bottom-second region of the second electrode are an uniform, integral bottom electrode region.

7. The rearview mirror as defined in claim 5, wherein the first region and the second region can be respectively connected to the control device through different electric circuits, and wherein the size and position of the first region are consistent with that of the at least one display region while the second region corresponds to the non-display region.

8. The rearview mirror as defined in claim 7, wherein when the at least one display region emits polarized display light, the control device applies different voltages to the first region and the second region to tune the rotation degree of the polarization of light transmitting through the different regions of the liquid crystal molecules layer, altering the polarization of light transmitting through the different regions of the corresponding liquid crystal molecules layer.

9. The rearview mirror as defined in claim 3, further comprising at least one light sensor, wherein the at least one light sensor is operatively connected to the control device, and when the light sensor detects strong ambient light, the control device sends a signal to the liquid crystal light-controlling layer to control the reflectivity of the entire rearview mirror.

10. The rearview mirror as defined in claim 1, wherein the at least one display region is disposed as a full-screen display area with a substantially uniform size as the reflective polarization layer.

11. The rearview mirror as defined in claim 1, further comprising an absorption layer, wherein the absorption layer is disposed below the reflective polarization layer and outside the at least one display region.

12. The rearview mirror as defined in claim 1, further comprising a polarizing backlight positioned below the at least one display region, wherein the polarizing backlight comprising:
   a light guide plate;
   a light source disposed on one side of the light guide plate;
   a quarter-wave plate and a reflective mirror disposed on the opposite side of the light guide plate against the light source;
   a birefringent film disposed above the upper surface of the light guide plate, wherein the ordinary refractive index of the birefringent film is close to the refractive index of the light guide plate, while the extra-ordinary refractive index of the birefringent film is larger than the refractive index of the light guide plate; and
   a microstructure formed between the birefringent film and the upper surface of the light guide plate.

13. The rearview mirror as defined in claim 1, further comprising a polarizing backlight positioned below the at least one display region, wherein the polarizing backlight comprising:
   a light guide plate;
   a light source disposed on one side of the light guide plate; and
   a quarter-wave plate and a reflective mirror disposed on the opposite side of the light guide plate against the light source,
   wherein the light guide plate includes a liquid crystal molecules layer for polarization scattering, wherein the orientation of the liquid crystal in the liquid crystal molecules layer is defined in a plane perpendicular to the surface of the light guide plate.

14. The rearview mirror as defined in claim 1, wherein the transparent cover substrate includes transparent glass through chemical or physical strengthening, and rigid or flexible polymer materials, wherein the light transmittance of the transparent cover substrate is 85% or higher.

* * * * *